(12) United States Patent
Brooks (10) Patent No.: US 7,379,191 B2
(45) Date of Patent: May 27, 2008

(54) OPTICAL MEMS WAVEFRONT DIAGNOSTIC TRANSCEIVERS AND RECEIVER

(75) Inventor: Lawrence D. Brooks, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/133,592

(22) Filed: May 20, 2005

(65) Prior Publication Data

US 2006/0262322 A1 Nov. 23, 2006

(51) Int. Cl.
G01B 11/00 (2006.01)

(52) U.S. Cl. ...................................... 356/515
(58) Field of Classification Search ............... 356/489, 356/495, 511–515
See application file for complete search history.

(56) References Cited

U.S. PATENT DOCUMENTS

| 3,857,636 A | | 12/1974 | Angelbeck | |
|---|---|---|---|---|
| 4,627,731 A | * | 12/1986 | Waters et al. | 356/479 |
| 5,457,533 A | * | 10/1995 | Wilcken | 356/491 |
| 6,614,535 B1 | * | 9/2003 | Kakuchi et al. | 356/515 |
| 6,963,408 B2 | * | 11/2005 | Ishii et al. | 356/521 |
| 2002/0024673 A1 | * | 2/2002 | Ouchi | 356/495 |
| 2004/0252311 A1 | | 12/2004 | Ishii et al. | |

FOREIGN PATENT DOCUMENTS

| WO | WO 99/12009 A1 | 3/1999 |
|---|---|---|
| WO | WO 03/029751 * | 4/2003 |

OTHER PUBLICATIONS

*Mach-Zehnder / Twyman-Green Hybrid Interferometer for Micro-Lens Testing*, S. Reichelt et al., DGaO Proceedings 2005, ISSN: 1614-8436, 2 pages.
*Mesoscopic Optical Instrumentation: A Miniature Fourier Transform Spectrometer*, C. Gonzalez et al., IEEE, 1997, pp. 474-475.
*Miniaturized LIGA Fourier Transformation Spectrometer*, C. Solf et al., IEEE 2003, pp. 773-776.

(Continued)

*Primary Examiner*—Samuel A. Turner
(74) *Attorney, Agent, or Firm*—Alston & Bird LLP (57) ABSTRACT

A combination interferometer (ifo) inspection device is provided which includes a Twyman-Green (T-G) ifo optically coupled to a Mach-Zehnder (M-Z) ifo. MEMS and MOEMS versions permit substantial reduction in size and weight to permit permanently embedding an inspection device into an optical system which permits remote and automated inspection and/or adjustment of the optical system. The inspection device permits use of different coherence length light sources and receipt of an output signal from an optical system. The addition of the T-G ifo to the M-Z ifo aids pinhole alignment and general alignment to the optical system under test, as well as inspection with long coherence sources, while the addition of the M-Z ifo permits measurement with long or short coherence sources, allows measurement of the output beam, and permits the system to operate in a receive-only mode with an external source. The inspection device provides versatile functionality and redundancy for using a single inspection device in a variety of situations and manners in the same application.

42 Claims, 4 Drawing Sheets

OTHER PUBLICATIONS

*Scanning Optical Microellipsometer for Pure Surface Profiling*, C. W. See et al., Applied Optics, vol. 35, No. 34, Dec. 1996, pp. 6663-6668.

*Surface-Micromachined Micro-XYZ Stages for Free-Space Microoptical Bench*, L. Y. Lin et al., IEEE Photonics Technology Letters, vol. 9, No. 3, Mar. 1997, pp. 345-345.

*Electrostatic Combdrive-Actuated Micromirrors for Laser-Beam Scanning and Positioning*, Meng-Hsiung Kiang et al., Journal of Microelectromechanical Systems, vol. 7, No. 1, Mar. 1998, pp. 27-37.

*Micromachining for Optical and Optoelectronic Systems*, M. C. Wu, Proceedings of the IEEE, vol. 85, No. 11, Nov. 1997, pp. 1833-1856.

*Linear Vibromotor-Actuated Micromachined Microreflector For Integrated Optical Systems*, M. J. Daneman et al., Solid-State Sensor and Actuator Workshop, Hilton Head, SC, Jun. 2-6, 1996, pp. 109-112.

* cited by examiner

FIG. 1

TWYMAN-GREEN TRANSCEIVER MODE

MACH-ZEHNDER RECEIVER MODE

FIG. 4

OPTICAL MEMS WAVEFRONT DIAGNOSTIC TRANSCEIVERS AND RECEIVER

FEDERALLY SPONSORED RESEARCH OR DEVELOPMENT

This invention was made with support of the United States Government under contract number F29601-97-C-001 awarded by the U.S. Air Force. The United States Government may have certain rights in the subject matter of this invention.

FIELD OF THE INVENTION

The present invention relates generally to an apparatus and method for inspecting an optical path or component or surface and, more particularly, to an apparatus and method for inspecting an optical path or component or surface using a combination Twyman-Green-Mach-Zehnder interferometer.

BACKGROUND

Optical systems can require quality control to ensure proper alignment and determine aberrations of the optical path of an optical system. An optical path carries light radiation from a source, typically a laser source, to an output device. And in going from the source to the output device, the radiation impinges upon and passes through mirrors and beam splitters and often passes through relay telescopes and lenses which focus, diverge, and converge the beam. This optical path may be modified and adjusted and may include misalignments, deficiencies, and aberrations which would advantageously be able to be measured. Further, quality control and inspection may be required to verify that hardware is built correctly and within specification requirements for accuracy and limitations on deficiencies and aberrations. Quality control of optical system can be performed by probing the optical path to troubleshoot a system. The testing of an optical path is only as accurate as the instrument performing the test. Thus, accuracy of the instrument is important. And, particularly for testing an optical system in operation or during use, the size and weight of the instrument and the time required to perform the testing are also important. Current instruments to probe optical paths are too large for use in many applications. Similarly, current instruments are too heavy to be used as permanent fixtures in many applications such as many airborne applications, thus, preventing the use of permanent testing instruments for remote or automated functionalities. Rather, current systems require temporary installation for inspection by very experienced hands-on individuals. The installation and removal of the inspection system from an optical system could misalign or damage the optical system. These restrictions on use of current instruments for testing optical paths limits the ability to test and limiting the quality control of many optical systems.

Accordingly, a need exists for an improved inspection apparatus and method for inspecting optical paths which is accurate, convenient to use, and capable of being integrally fixed within the optical system for remote or automated testing.

SUMMARY OF THE INVENTION

In light of the foregoing background, an improved apparatus and method for inspecting optical paths are provided which are accurate, convenient to use, and capable of being integrally fixed within the optical system for remote or automated testing according to three modes of operation: Twyman-Green transceiver mode, Mach-Zehnder transceiver mode, and Mach-Zehnder receiver mode.

According to one aspect of the present invention, apparatuses for inspecting optical paths are provided. One advantageous embodiment of an apparatus of the present invention includes a combination interferometer, a light source, and an optical sensor. The combination interferometer may include a Twyman-Green interferometer (TGI) and a Mach-Zehnder interferometer (MZI). The Twyman-Green interferometer is coupled before the Mach-Zehnder interferometer. The light source may be optically coupled to impinge a beam upon the Twyman-Green interferometer. A lens may be embedded to couple the beam emerging from the Twyman-Green interferometer. This embedded output lens is on the inspection side of the Twyman-Green interferometer not on the impinging side of the Twyman-Green interferometer between the Twyman-Green interferometer and the point source. An external focusing lens may be coupled to receive from and impinge back upon this embedded output lens and thence back into the Twyman-Green interferometer. This external lens may be a discrete, replaceable lens selected to match an optical system under test or an optical component of an optical system under test. For example, the external lens may recollimate a beam from the embedded output lens into an inspection beam for testing the optical system. An optical sensor may be optically coupled to receive an output beam from the Mach-Zehnder interferometer. A second external lens may be optically coupled to receive an output beam from the Mach-Zehnder interferometer and to modify the beam size and enable imaging at the optical sensor.

An optical beam diagnostic apparatus may include three embedded lenses, three beam splitters, at least three mirrors, and a pinhole to create the Twyman-Green interferometer which passes a beam to a Mach-Zehnder interferometer. The optical beam diagnostic apparatus may also include an attenuator and/or a shutter. The retroreflecting mirror in the Twyman-Green interferometer may be a corner cube reflector.

According to another advantageous embodiment of the present invention, a system may include an optical system under test with an embodiment of the optical beam diagnostic apparatus described above embedding in the optical system using MOEM components. The lenses may be MOEM lenses, such as MOEM ball lenses, GRIN lenses, microlenses, refractive microlenses, zone plates, and diffractive lenses. The beam splitters may be MOEM beam splitters. The mirrors may be MOEM reflective components, such as MOEM mirrors. The pinhole may be a MOEM pinhole. The attenuator may be a MOEM attenuator. The shutter may be a MOEM shutter.

According to another aspect of the present invention, methods for inspecting optical paths are provided. One advantageous embodiment of a method of the present invention referred to herein as the "Twyman-Green mode" involves using the Twyman-Green interferometer in a transceiver mode and includes the steps of splitting a beam of a light source into a transmitted beam and a reflected beam, retroreflecting the reflected beam, converging the transmitted beam to form an inspection beam for inspecting an optical system, receiving a resultant beam from the optical system, collimating the resultant beam, reflecting the resultant beam, transmitting the retroreflected beam, converging the resultant beam and the retroreflected beam, reflecting both beams off a beam splitter and mirror, and transmitting both beams through a beam splitter to the optical sensor. With this method the pinhole in the Mach-Zehnder interferometer may be moved or blocked such that no beams pass through the pinhole, and the attenuator in the Mach-Zehnder interferometer may be adjusted to vary signal level at the sensor. The method may also include the steps of impinging the light beam of the light source upon a first collimating lens and collimating the beam. The method may also include the steps of impinging the various beams upon different components to facilitate the previously described steps of the invention, such as impinging the resultant beam and the retroreflected beam upon a beam splitter to split the beams into partially reflected and partially transmitted beams corresponding to the resultant beam and the retroreflected beam. The method may also include the steps of collimating the inspection beam for inspecting the optical system and then converging the resultant beam after receiving the resultant beam from the optical system and before collimating the resultant beam. The method may also include the steps of focusing the output beam and capturing the output beam.

Another advantageous embodiment of a method of the present invention referred to herein as the "Mach-Zehnder transceiver mode" involves using the Mach-Zehnder interferometer in a transceiver mode and includes the steps of splitting a beam of a light source into a transmitted beam and a reflected beam, blocking the reflected beam, converging the transmitted beam to form an inspection beam for inspecting an optical system, receiving a resultant beam from the optical system, collimating the resultant beam, reflecting the resultant beam, converging the resultant beam, splitting the resultant reflected beam into a transmitted beam and a reflected beam, passing at least one of the transmitted beam or reflected beam through a pinhole in a blocking element and, (if needed to balance the relative strengths of the two beams for better contrast at the sensor), the other through an attenuator, reflecting the transmitted beam, reflecting the reflected beam, and recombining the transmitted beam and third reflected beam to produce an output to the imaging lens and sensor. The method may also include the steps of impinging the light beam of the light source upon a first collimating lens and collimating the beam. The method may also include steps such as impinging the resultant beam and the retroreflected beam upon a beam splitter to split the beams into partially reflected and partially transmitted beams corresponding to the resultant beam and the retroreflected beam. The method may also include the steps of collimating the inspection beam for inspecting the optical system and then converging the resultant beam after receiving the resultant beam from the optical system and before collimating the resultant beam. The method may also include the steps of focusing the output beam and capturing the output beam.

Another advantageous embodiment of a method of the present invention referred to herein as the "Mach-Zehnder receiver mode" involves using the Mach-Zehnder interferometer in a receiver mode and includes the previously described steps for the transceiver mode except those related to the incident light source.

Another advantageous embodiment of an apparatus of the present invention includes the steps of the methods of inspecting an optical system as previously described, adjusting the optical system, and then re-inspecting the optical system. The inspection of the optical system may be performed periodically by repeating the steps of inspecting and adjusting the optical system. The output beam on the output sensor may be analyzed, and the invention apparatus may also be adjusted based upon the analysis of the output beam. The adjustments to the invention apparatus may be performed using at least one of micro-electromechanics and micro-optoelectromechanics. The analysis of the output beam may include analyzing at least one of a static fringe pattern interferogram and a phase-shifted interferogram set.

These and other characteristics, as well as additional details, of the present invention are further described herein with reference to these and other embodiments.

BRIEF DESCRIPTION OF THE DRAWING

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers and variables refer to like elements and parameters throughout.

Figure 1:
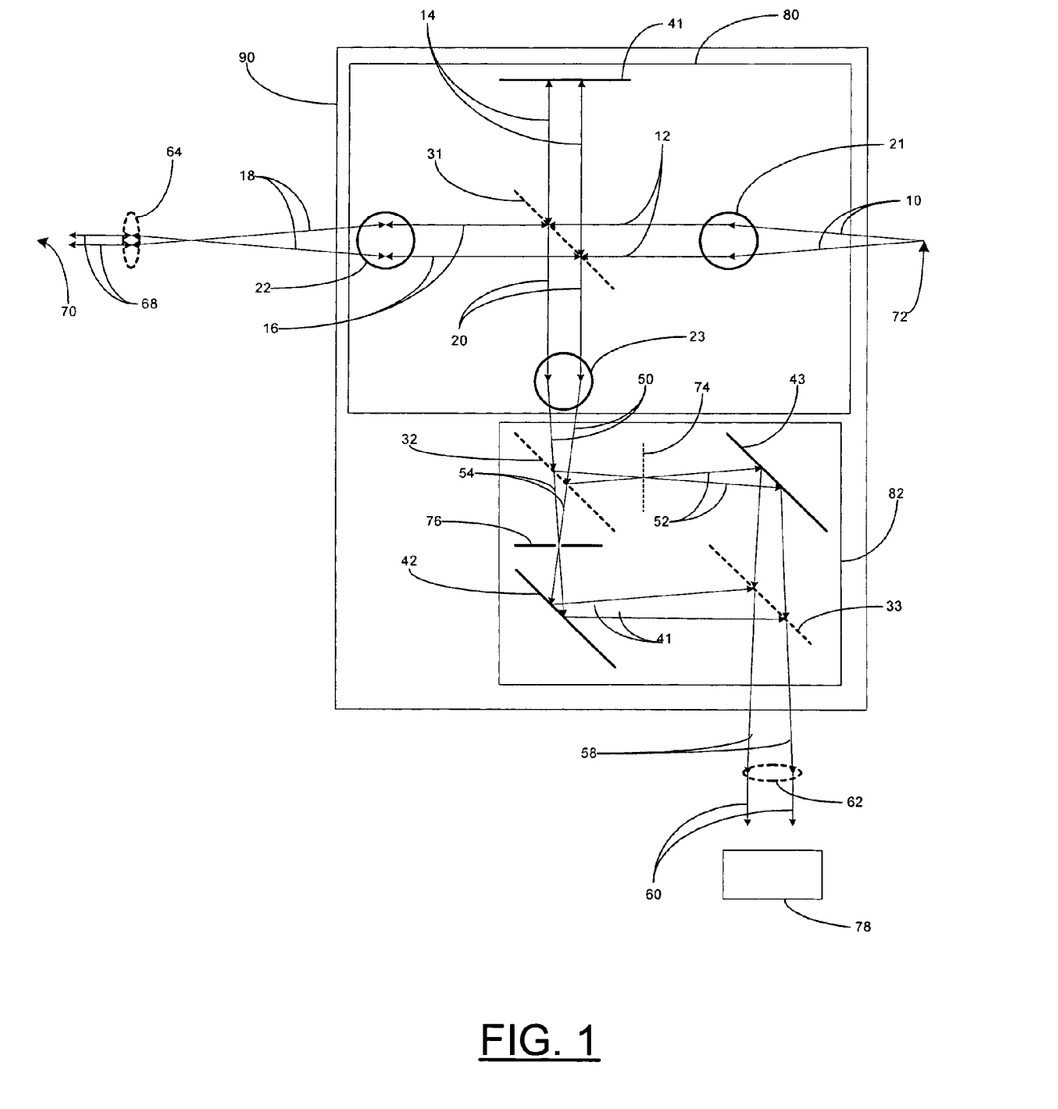
FIG. 1 is a schematic diagram of an inspection apparatus according to an embodiment of the present invention.
Figure 2:
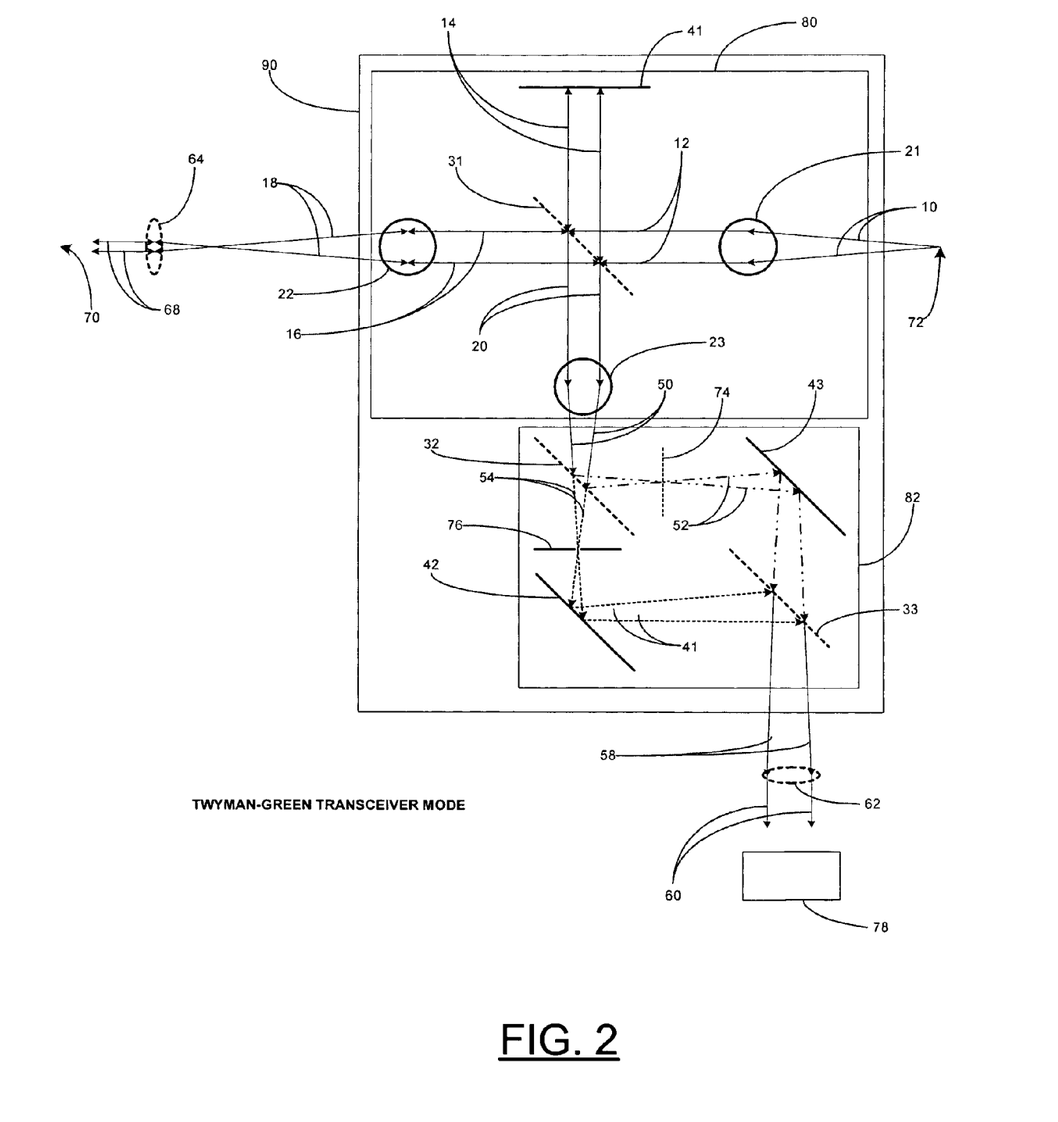
FIG. 2 is a schematic diagram of an inspection apparatus according to an embodiment of the present invention operating in a Twyman-Green transceiver mode.
Figure 3:
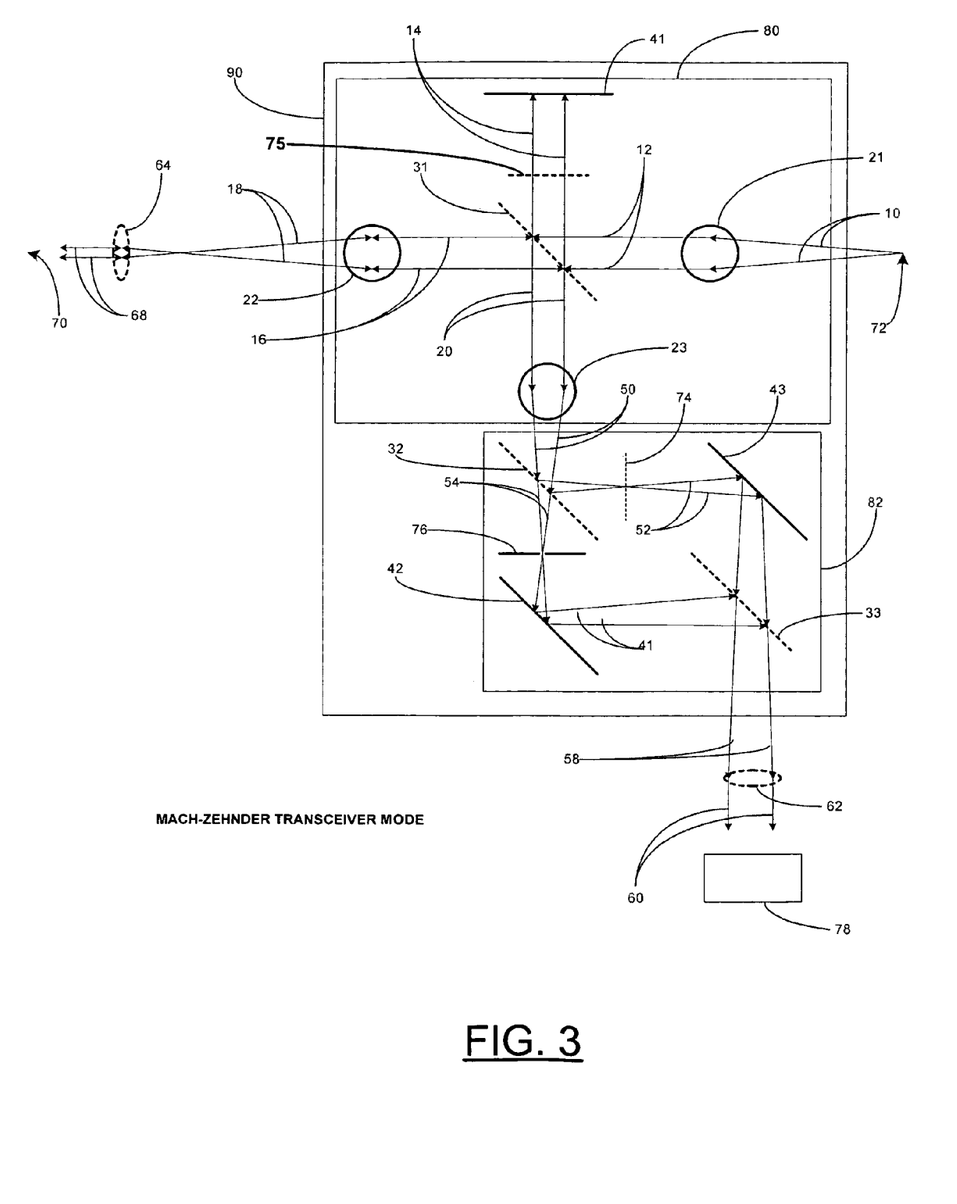
FIG. 3 is a schematic diagram of an inspection apparatus according to an embodiment of the present invention operating in a Mach-Zehnder transceiver mode.
Figure 4:
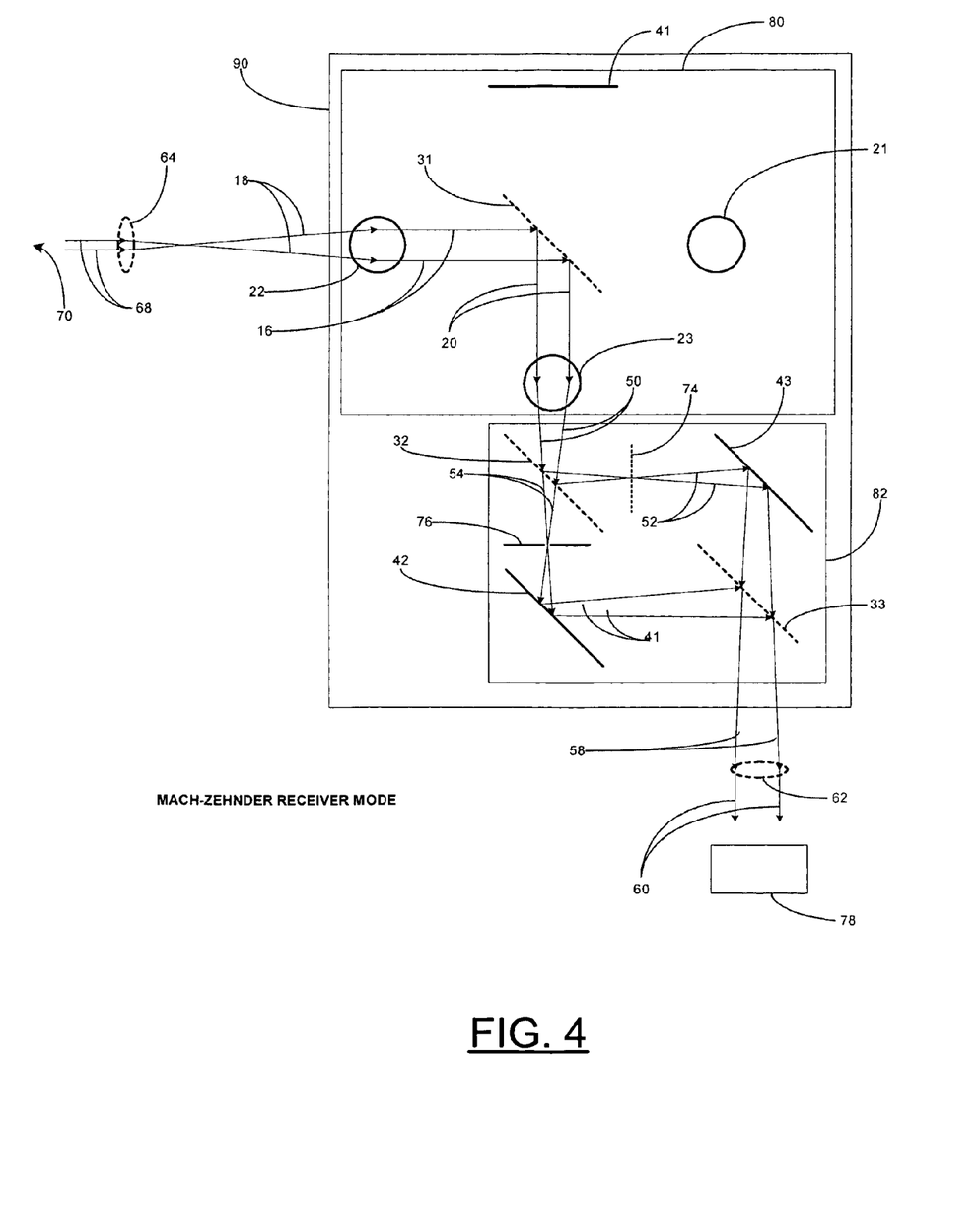
FIG. 4 is a schematic diagram of an inspection apparatus according to an embodiment of the present invention operating in a Mach-Zehnder receiver mode.

Embodiments of the present invention are described with reference to three modes of operation: Twyman-Green transceiver mode, Mach-Zehnder transceiver mode, and Mach-Zehnder receiver mode. FIG. 1 is a schematic diagram showing all of the various operations of each of the three modes of operation. FIGS. 2, 3, and 4, are particular examples of each of the modes of operation. FIG. 2 is an example of Twyman-Green transceiver mode. FIG. 3 is an example of Mach-Zehnder transceiver mode. FIG. 4 is an example of Mach-Zehnder receiver mode.

While embodiments of the present invention may be particularly useful for testing optical systems in airborne applications, the invention may also be useful in many domains and for a variety of other applications.

As used herein, reference to Micro-ElectroMechanical Systems (MEMS) and MEM devices and components includes Micro-OptoElectroMechanical Systems (MOEMS) and MOEM devices and components and reference to MOEMS and MOEM devices and components includes reference to MEMS and MEM devices and components. The terms MEMS and MOEMS are commonly used interchangeably, irrespective of the optical properties or characteristics of a MOEM component or lack thereof in a MEM component. Further, as used herein, reference to MEM and MOEM components include components which may not be opto, electrical, or mechanical, but are micro-sized to be used with MEM and MOEM components and used in MEMS and MOEMS. In some instances, both terms may be used to emphasize the exactness of these terms, and only in these instances are the terms exclusive; in all other instances, reference to either term, MEM and MOEM, also refers to the other term, MOEM and MEM, respectively. Also, as used herein, reference to a Michelson interferometer includes reference to a Twyman-Green interferometer. As known to those of ordinary skill in the art, a Twyman-Green (T-G) interferometer (ifo) (TGI) is similar to a Michelson interferometer, but a Twyman-Green interferometer is illuminated with a collimated light source which is typically monochromatic or nearly monochromatic. Often the light source for a Twyman-Green interferometer is a point source collimated with a well-corrected lens. An optical path or optical train is a term used to commonly refer to a collection of optical components in a path, which do not necessarily create a straight line. Reference to an optical path also refers to an optical train, both referring to a collection of optical components which form a sequence for an optical system. As used herein, the inspection of an "optical path" is descriptive of the inspection of an optical path, an optical component, and a surface. Reference to a "mirror" is non-exclusively inclusive of a flat front surface reflector and like reflecting elements. Reference to a "retroreflector" is non-exclusively inclusive of a mirror and corner cube reflectors. Corner cube reflectors are retroreflector elements that return wavefronts flipped up-down and left-right, and therefore may not generally be preferred for some applications, such as when the light source has low spatial coherence or non-negligible aberrations are present prior to the Twyman-Green interferometer beamsplitter. For example, if a corner cube is used as the retroreflector at the end of an optical path under test, the aberrations in the wavefront of the retroreflected beam may cancel some of the aberrations in the path such that the resultant return beam wavefront does not accurately represent the true aberration content of the path under test. Reference to a "blocking element" is non-exclusively inclusive of optical components such as partially-transmitting attenuators, blocking or phase masking elements with pinhole-sized openings (referred to as pinholes), shutters, other non-transparent and non-reflective components, reflective components which deflect an optical beam, and like blocking components.

Referring now to FIG. 1, an apparatus 90 for inspecting an optical path of an optical system 70 according to one embodiment of the present invention is depicted. FIG. 1. is a schematic diagram showing functions for all of the various operations of each of the three modes of operation. Specific differences between the three modes of operation are described below and more clearly delineated with reference to FIGS. 2, 3, and 4, which show example embodiments for each of the three modes of operation. The apparatus 90 may include or be used in conjunction with a light source 72, typically a point light source, such as an illuminated pinhole or a laser, such as a fiber-coupled laser or a laser diode with or without fiber coupling. The light source may include a fiber optic fiber to create the point light source. Alternatively a "free-space" laser could be used with an external focusing lens. Regardless of the type of laser, the wavelength of the laser should match the designed wavelength of the optical path under test. For sufficient signal strength at the sensor, path testing with tens (10s) to hundreds (100s) of milliwatts (mW) may be desirable due to losses in the optical path. Although the optical power may need to be controlled, such as having more than 10s of mW at a pinhole, such as when using a MEMS pinhole, unless the pinhole is a high power pinhole. The power of the laser may also be kept down to prevent heating up MEMS components which could cause thermal distortions and introduce errors. The apparatus 90 may further be used in conjunction with or include external lenses 62, 64 and an optical sensor 78 such as a camera or a digital camera or like device capable of capturing the optical beam irradiance distribution incident thereon. This type of apparatus may be used to probe an optical path of an optical system to be used for determining the aberrations or misalignments of the optical system. Additional optical components may be required to optically couple the apparatus to the optical system under test. By creating such an apparatus with MEM and/or MOEM components, the tiny size of the resulting apparatus will permit the inspection apparatus to be inserted and/or embedded into optical systems and other locations otherwise inaccessible using current inspection apparatuses.

One of ordinary skill in the art will recognize that the present invention takes advantage of known interferometers, specifically a Twyman-Green interferometer 80 and a Mach-Zehnder (M-Z) interferometer 82. The Twyman-Green interferometer 80 is coupled to the Mach-Zehnder interferometer (MZI) 82 to inspect the optical system with the Twyman-Green interferometer 80 and then pass the resulting beams 50 from the Twyman-Green interferometer 80 into the Mach-Zehnder interferometer 82 or to pass an inspection beam through the Twyman-Green interferometer 80 into the Mach-Zehnder interferometer 82 to inspect the optical system.

The following describes the available operations of an apparatus according to one embodiment of the present invention. A light source 72 such as a laser beam 10 exiting from a fiber optic fiber (not depicted) is collimated by a collimating lens 21 such as an MOEM ball lens, GRIN lens, microlens, refractive microlenses, zone plates, and diffractive lenses. MOEM ball lenses typically are spheres of glass or other hard transmitting material. GRIN lenses are Gradient Index, or Graded Index, rods in which the refractive index varies, typically produced so the material refractive index of the lens varies continuously as a function of spatial coordinates in the medium, such as an oxide glass lens with a radial variation of refractive index. Microlenses typically are molded as spheres with less spherical aberration than ball lenses. Zone plates and diffractive lenses typically are made from etched polysilicon with depositions, which are raised and latched into position. MOEM ball lenses, GRIN lenses, microlenses, refractive microlenses, zone plates, and diffractive lenses are typically only a few millimeters (mm) in size. The collimated beam 12 is directed to a beam splitter 31 which transmits a portion of the collimated beam 12 into a transmitted beam 16 and partially reflects a portion of the collimated beam 12 into a reflected beam 14, or reference beam. The reflected beam 14 is retroreflected by a mirror 41, which may be a corner cube reflector, to produce a retroreflected "reference" beam. The beam splitter may be a MOEMS beam splitter. As an example, a MOEMS beam splitter may be made of thin polysilicon plates formed by a standard MUMPS process, preferably with few or no release holes for better optical quality, and may be over-coated with chrome for bonding gold and over-coated with gold for greater reflectivity and transmissivity. MOEMS beam splitters may be hinged and latched into position. MOEMS beam splitters may also be made from bulk micromachining of single crystal silicon. The mirror may be a MOEMS mirror. As an example, a MOEMS mirror may include reflective components such as polysilicon plates formed by a standard MUMPS process, preferably with few or no release holes for better optical quality, and may be over-coated with chrome for bonding gold and over-coated with gold for reflectivity. MOEMS mirrors may be hinged and latched into position, unless used for alignment. Alignment MOEMS mirrors may be similar to standard MOEMS scanning mirrors with torsional supports and comb drives, but may be thicker since high scanning speeds may not be necessary. Bulk micromachining techniques may also be used to form MOEMS mirrors. The transmitted beam 16 is directed to a second lens 22, also referred to as an embedded output lens, and is diverged or focused into an inspection beam 18 which is impinged upon an optical system 70 for testing. The inspection beam 18 may be collimated by an external lens 64 to produce a collimated beam 68 for testing the optical system 70. This external lens 64 may be a discrete, replaceable lens selected to interface with the optical system 70 under test. A discrete lens is one not imbedded as a part of the system, which may be easily removed, replaced, or changed which permits accommodation for testing different systems. External lenses may be large to interface with the system under test or optical sensor with nominally collimated beams. The external lens 64, such as an external lens that collimates the inspection beam 18, would not be necessary if the optic under test is to be tested at its center of curvature. If the focus of the inspection beam 18 coincides with the center of curvature of an optical component or surface under test or the front focal point of a collimator which has a retroreflector on its transmitted side, the beam will be retroreflected back to that center of curvature or focal point of the second lens 22, and the external lens 64 would not be required. After reflection within the optical system under test, the beam is returned as a resultant beam, possibly through the external lens 64, to the second lens 22 and then the beam splitter 31. For Twyman-Green mode operations, depicted in FIG. 2, the resultant beam is combined with the retroreflected reference beam at the beam splitter 31 to produce beams 20 which will form an interference pattern (if the source coherence is long enough), representing the misalignments, deficiencies, and/or aberrations of the optical system 70 under test. By comparison, for Mach-Zehnder transceiver mode operations, depicted in FIG. 3 and described further below, the reflected beam 14 may be blocked, such as with a shutter or other blocking element between the mirror 41 and the beam splitter 31. A shutter may be a MEMS or MOEMS shutter. As an example, a MEMS or MOEMS shutter may be made of a thin polysilicon plate formed by a standard MUMPS process, preferably with few or no release holes, and may be over-coated with chrome for bonding gold and over-coated with gold for improved opaqueness. A MEMS or MOEMS shutter would be moveable, such as using a hinged-and-latched pop-up type shutter or a more a translating type shutter, and actuated with a standard MEMS actuation, such as a comb drive, vibromotor or scratch drive. The shutter travel must be at least as great as the diameter of the beam or pinhole aperture. For Mach-Zehnder receiver mode operations, depicted in FIG. 4, an incident light source is not required and is not shown in FIG. 4, and the beam splitter 31 need only reflect the beam from the optical system 70. In FIG. 4 there are no incident beams from a light source, collimation at the first lens 21, reflection or transmission at the first beam splitter 31, or retroreflection at the first mirror 41. The third lens 23 focuses the beam(s) 20 into a Mach-Zehnder interferometer arrangement. The Mach-Zehnder interferometer arrangement may include a pinhole aperture 76 at one focus and an attenuator 74 near the other focus. The pinhole aperture 76 may be a MOEMS pinhole. As an example, a MOEMS pinhole may be a thin polysilicon plate formed by a standard MUMPS process with a small circular hole etched completely through the plate. The diameter of the hole would be nominally the wavelength times the f-number of the third lens 23 (the focal length divided by beam diameter of the third lens 23), the lens that focuses the electromagnetic radiation into the Mach-Zehnder interferometer. If required, a MOEMS pinhole aperture may be attached to a linear comb drive, a vibromotor, or a scratch device actuator to achieve translation of the pinhole aperture in one axis, transverse or longitudinal, to aid in alignment to the focused beam. The attenuator 74 may be movable with different attenuations.

Alternatively, as described below, this optical element 74 may be a pinhole rather than an attenuator (with an attenuator now in the optical element 76 position), such as to permit alignment of a beam to the pinhole by tilting of a first beamsplitter 32 of the Mach-Zehnder interferometer arrangement 82 or to cancel astigmatism from tilted plates in non-collimated beams. Cancellation of astigmatism refers to performing common-mode cancellation of astigmatism in both legs of the Mach-Zehnder interferometer arrangement 82, where a pinhole 74 is placed in the reflected leg with the coating of the first beamsplitter 32 of the Mach-Zehnder interferometer being on the incoming, front side so as to generate astigmatism in the transmitted beams 54 rather than the reflected beams 52 and where the coating of the second beamsplitter 33 of the Mach-Zehnder interferometer is on the reflecting side so as to generate astigmatism on transmission of the reflected beams 52 rather than on reflection of the transmitted beams 54. Thus, one beam path picks up astigmatism through transmission of the first beamsplitter 32, and the other beam path picks up astigmatism through transmission of the second beamsplitter 33. Although the beamsplitter may be so thin as to make astigmatism negligible, this previously described common-mode cancellation of astigmatism may be used if astigmatism generated by non-collimated beams passing through the beamsplitters 32, 33 is not negligible. An attenuator is an optical element which reduces the transmission of electromagnetic radiation as a beam passes through the attenuator, often to reduce the strength of the beam to more closely match the strength of another corresponding beam, such as might pass through a pinhole aperture. By matching beam strengths, an optical sensor may be able to obtain improved contrast and signal-to-noise ratio. An attenuator may be, for example, a polarizer or a beam splitter. An attenuator may be a MOEM attenuator. A MOEM attenuator is a partially but uniformly transmitting thin optical element of a MOEM configuration. As an example, a MEMS or MOEMS attenuator can be made of a thin polysilicon plate formed by a standard MUMPS process, preferably with few or no release holes, and may be over-coated with chrome for bonding gold and over-coated with gold for greater opaqueness or reflectivity. Attenuators may also be formed by bulk micromachining. An attenuator in this application reduces the strength of the electromagnetic beam uniformly across the beam, not in the pinhole leg but in the attenuator leg, so that the electromagnetic beam in the attenuator leg more closely matches the strength of the electromagnetic beam in the pinhole leg after it passes through the pinhole. The attenuator reduces the strength of the attenuator leg electromagnetic beam to improve contrast and signal-to-noise ratio at the sensor.

An attenuator, however, is not always a required component of embodiments of the present invention, but can be included to improve contrast in the resulting interference pattern and therefore permit sensing of signals that otherwise may not be sensed. Converging beams 50 from the lens 23 of the Twyman-Green interferometer arrangement are split at a first beam splitter 32 of the Mach-Zehnder interferometer arrangement 82 into a transmitted beam 54 and a reflected beam 52. For Twyman-Green mode operations, the pinhole may be blocked by a shutter or other blocking means, or the pinhole may be moved in a way that the second transmitted beam 54, the transmitted combined resultant and reflected reference beams, are blocked. The reflected beam 52, the reflected combined resultant and reflected reference beams, is reflected by a mirror 43 and transmitted through a beam splitter 33 to an external lens 62 and optical sensor 78. Alternatively for Twyman-Green mode operations, the reflected beam 52, the reflected combined resultant and reflected reference beams, may be blocked, and the second transmitted beam 54, the transmitted combined resultant and reflected reference beams, may be twice reflected to an external lens 62 and optical sensor 78. An external lens may not be necessary if imaging at the optical sensor is not required and if the beam size on the optical sensor is satisfactory. However, often there is a location in the optical path or the interferometer that should be imaged, such as a location at the aperture stop, which might be at the first external lens 64.

An embodiment of the present invention may also provide additional alignment between the Twyman-Green interferometer and the Mach-Zehnder interferometer. For example, two alignment mirrors may be included between the third lens 23 and the second beam splitter 32. Adding these alignment mirrors has the additional possible advantage of restoring the line of sight into a single line between the first beam splitter 31 and optical sensor 78. Another embodiment of the present invention may provide additional alignment on the output side of the Mach-Zehnder interferometer between the last beam splitter 33 and second external lens 62.

For Mach-Zehnder (MZ) transceiver mode operations, depicted in FIG. 3, the reference beam 14 is blocked, such as by a moveable shutter 75 or tilting or rotating the mirror 41. This step is not required when operating in a Mach-Zehnder receiver mode because there is no reflection between the first beam splitter 31 and the first mirror 41 of a beam from an incident light source. And when operating in a Twyman-Green mode, the retroreflection of the reference beam is a necessary step. However, when operating in a Mach-Zehnder transceiver mode, retrotreflection of a reference beam is not required. Accordingly, a hinged or sliding MEMS shutter might be actuated with a vibromotor, scratch drive actuator, comb drive, or other standard MEMS actuation method. For Mach-Zehnder mode operations, the transmitted beam 54 is spatially filtered by a pinhole 76 to remove the effects of aberrations and is reflected by a mirror 42 and the third beam splitter 33 while the reflected beam 52 passes through an attenuator (or pinhole) 74, if present, and is reflected off a mirror 43 and transmitted through the third beam splitter 33. The reflected beam 52 and transmitted beam 54 are recombined to produce an output which may have a fringe pattern interferogram representing the aberrations of the optical system 70 under test. The recombined beam 58 may be incident upon an optical sensor 78. An external lens 62 may be used for imaging the combined beams 58 for capture by the optical sensor 78. Alternatively, as described above, the pinhole 76 and attenuator 74, if present, can be switched to spatially filter the reflected beam 52 and attenuate the transmitted beam 54. A pinhole 76, or other blocking element, may also be in a reflected leg and, in fact, generally will be in a reflected leg to permit cancellation of tilted-plate aberrations when beam splitters have non-negligible thickness. Since typically more light is transmitted through the second beam splitter 32 when the pinhole is in the transmitted leg, it may be preferable to block the non-pinhole leg and move the pinhole 76 out of the way for Twyman-Green mode operations. This results in impinging a greater signal upon the optical sensor, which may be required for testing of very low throughput systems, although it is more complicated than simply blocking or moving the pinhole (which has the effect of blocking the pinhole leg) for those operations. Similarly, when a pinhole is on the reflected side of the second beam splitter 32, more light is typically reflected, and it may be preferable to block the non-pinhole leg and move the pinhole 76 out of the way for Twyman-Green operations. A pinhole 76 may be on a slide with three or more positions: large hole for letting all light through, small hole or holes for creating the reference beam, and blocked for preventing light from passing through. A pinhole diameter may be equal to or approximately equal to "lambda" ($\lambda$) times "F" divided by "D"

$$\left(\frac{\lambda F}{D}\right),$$

where lambda ($\lambda$) is the wavelength under test, F is focal length of the second embedded lens 23, and D is the diameter of beam 20. Slightly different sizes may be used depending on accuracy required, aberrations present, and signal strength desired. The positions of a pinhole may be controlled such as using a MEMS slide actuator.

Alignment of an optical beam through a pinhole, typically on the order of one to a few microns, is required to transmit a maximum amount of electromagnetic radiation through the pinhole. An advantage of a MEMS construction over an assembly from discrete parts is that precise alignment of a MEMS pinhole may be obtained by design through microlithography and standard MUMPS processes or bulk micromachining. Alignment of an optical beam involves vertical alignment, horizontal alignment, and longitudinal (axial) positional alignment. For example, the resulting beam 50 from the Twyman-Green interferometer 80 can be aligned, such as aligning the reflected beam 52 though a pinhole located at or near a reflected position from the second beam splitter 32 as indicated by the attenuator 74, aligning the transmitted beam 54 through a pinhole 76 beyond the second beam splitter 32, or aligning any other optical beam in the inspection device. MEMS activation devices are available for this type of alignment. Longitudinal (axial) positional alignment can be achieved, for example, by adjusting the separation between the third lens 23 and the pinhole 76 through which an optical beam is to be aligned for longitudinal (axial) position, although as described above this may not be necessary for a MEMS device that is designed with precise alignment. For example, the third lens 23 and/or the pinhole 76 can be translated longitudinally (axially) along the optical path, closer or further from the pinhole 76 or the third lens 23, respectively. Vertical and horizontal alignment can be achieved, for example, by introducing one two-axis mirror or two one-axis mirrors between the third lens 23 and the second beam splitter 32 and tilting the additional mirror(s) and/or beam splitter 32 until the beam is vertically and/or horizontally aligned to transmit through the pinhole 76. Alternatively, or in addition, the aperture of the pinhole 76 can be translated vertically and/or horizontally as required. Any combination of the above describe alignment operations can be used. For example, the third lens 23 can be translated along the optical axis for longitudinal (axial) position alignment, a one-axis mirror can be tilted for vertical alignment, and the pinhole 76 can be translated horizontally.

If a static fringe reduction mode is desired, a proper number range of fringes needs to exist across the interferogram. To achieve this for Mach-Zehnder mode operations for example, the output beam splitter 33 may be tilted to introduce fringes for data reduction and/or mirrors 42, and/or 43 may be adjusted. For Twyman-Green mode operations, the reference mirror 41 may be adjusted. A conventional software program may be used to analyze data from static fringe patterns of an embodiment of the present invention. Typically, twelve to fifteen fringes may be introduced for data reduction by a software program, although more or less may be desirable depending on the spatial frequency of the aberrations.

If phase shifting reduction mode is desired for the Mach-Zehnder mode, one of the Mach-Zehnder mirrors 42, 43 may be phase shifted, one method being translating in a direction nominally perpendicular to the optical surface. In a MEMS application, an electrostatically driven membrane may be used. If using an electrostatically driven MEMS membrane, the mirror and beam splitter layouts may be different than depicted in FIGS. 1, 2, 3, and 4 in order to have the membrane in the plane of the base material. Alternatively, if phase shifting is desired for the Twyman-Green mode, and if the coherence length of a laser source is great enough, the mirror 41, such as a corner cube, of the Twyman-Green interferometer arrangement 80 may be phase shifted. In such a case, a shutter or other blocking element may be used to block the transmission through the pinhole 76, or the pinhole 76 may be slightly translated to prevent transmission of the transmitted beam 54 through the focus of the Mach-Zehnder interferometer arrangement 82 near or at the pinhole 76. A conventional software program may also be used to analyze data from phase shifting patterns of an embodiment of the present invention. The document "*Micromachining for Optical and Optoelectronic Systems*" by Ming C. Wu, Proceedings of the IEEE, Vol. 85, No. 11 (November 1997), describes individual MEMS components for building an embodiment of the present invention. These components are typically found on a free-space micro-optical bench (FS-MOB) For example, an embodiment of the present invention may use a comb-drive actuation of hinged mirrors for mirror tilting. The document "*Electrostatic comb drive-actuated micromirrors for laser-beam scanning and positioning*" by M. H. Kiang et al., IEEE J. Microelectromechanical Systems, Vol. 7, No. 27 (1998), also describes MEMS components capable of use in an embodiment of the present invention. For example, comb actuators may be used for "popup" dynamics that may be used for shutters that rise and fall into and out of an optical path for blocking a beam. The document "*Linear-Vibromotor-Actuated Micromachined Microreflector for Integrated Optical Systems*" by M. J. Daneman, N. C. Tien, O. Solgaard, K. Y. Lau, and R. S. Muller, 1996 Sensor and Actuator Workshop, Transducer Research Foundation, Hilton Head Island, S.C., Jun. 2-6, 1996, pp. 109-112, describes that linear actuation for lateral shutter or pinhole motion may utilize a MEMS slide-actuated vibromotor. Fine linear actuation scratch drive actuators (SDAs) may also be used by an embodiment of the present invention and are described by L. Y. Lin et al. in IEEE Photonics Technology Letters, Vol. 9, No. 3, p. 345 (March 1997). Ball lenses made from optical glass are commercially available, such as from Melles Griot and Newport Corporation. GRIN lenses are commercially available, such as from Melles Griot, Newport Corporation, and Thor Labs, Inc. Diffractive optics and zone plates may be fabricated in polysilicon to provide focal lengths greater than provided using ball or GRIN lenses. A refractive microlens may also be used to provide a particular focal length and may be manufactured from a photoresist/polyimide reflow technique. See "*Micromachining for Optical and Optoelectronic Systems*" by Ming C. Wu.

An embodiment of the present invention may be used to diagnose or analyze a single element or component of an optical system or may be used to diagnose a resultant wavefront that impinges upon multiple components of an optical system, each of which is one components in the optical path. Typically, an embodiment of the present invention would impinge an inspection beam upon the optical system under test and receive a reflected beam, or resultant beam, from the optical system. Alternatively, an embodiment of a present invention may receive an originating beam from an optical system, as described further herein.

Fringes may be analyzed, such as by identifying the centers of the fringes for each line and using the centers of the fringes in a data reduction program. This type of fringe reduction is referred to as a static fringe center reduction. However, embodiments of the present invention may be used with phase shifting interferograms to analyze optical components and/or optical paths of optical systems. For example, in a spatial bin phase shifting technique, a large number of fringes, typically hundreds, may exist over the sensor, or sensor array, such that there may be three or four detector pixels per fringe. In a temporal phase shifting technique, a mirror may be moved in real time and data of an output beam recorded during the movement of the mirror. By comparison, the static fringe patterns are created by moving a mirror to a fixed position and creating an interference pattern. Moving a mirror may be a linear movement such as extending the length of a beam. Other components of embodiments of the present invention, such as a beam splitter, may be moved linearly or tilted at an angle to produce or change fringe patterns. For example, it may be an advantage to tilt a beam splitter because input beams overlap at a beam splitter, and by tilting the beam splitter, the beams will remain overlapped at that position. Thus, the beams will be overlapped on an optical sensor if the external focusing lens for the optical sensor images the output beam splitter location onto the optical sensor and makes the optical sensor conjugate to the beam splitter. By comparison, when tilting one of the mirrors or beam splitters not conjugate to the optical sensor, the beam or beams will move at the optical sensor. One of ordinary skill in the art will recognize that moving a component of an embodiment of the present invention such as linear movement or tilting of the component may include movement in multiple directions. For example, shifting a mirror may include drawing the mirror backwards so that the path to the mirror is longer than previous, and pushing the mirror forward to reduce the path to the mirror. This movement creates different interference patterns which may be detected and analyzed. Similarly, one of ordinary skill in the art will recognize, as mentioned, that embodiments of the present invention may be run in a phase shifting mode as well as to a static fringe pattern modes.

One advantage of the embodiments of the present invention is that light sources of different coherence lengths may be used with a single inspection device of the present invention. For example, if a laser has a short coherence length, meaning that when a short coherence length beam is split into two parts, each of the paths must be almost exactly the same (depending on the degree of coherence) to be able to see fringes. If the light source has a long coherence length, the two legs or paths of the interferometer may have different lengths. The two legs of the Twyman-Green interferometer may be very different lengths, one translating simply to the first retroreflecting mirror and the other translating to inspect the optical system and retroreflecting from the last element in that system. If a long coherence length laser is used, the recombined resulting beams may include an interference pattern which may be used for analysis without splitting the beams using the Mach-Zehnder interferometer. Alternatively, if the optical path is so long that the recombined beam in the Twyman-Green interferometer does not have an interference pattern due to the short coherence length of the source, then the Mach-Zehnder interferometer may be used to produce the interference pattern because the two legs of the Mach-Zehnder are precisely matched in length or at least the path difference is much smaller than the coherence length. By combining the Twyman-Green interferometer with the Mach-Zehnder interferometer, the inspection apparatus has two possibilities to create the fringe pattern used for phase shifting or static fringe center analysis of the optical system.

In addition to operating in transceiver modes, such as depicted in FIGS. 2 and 3, in which embodiments of the present invention probe an optical system by providing a beam from the Twyman-Green interferometer to the optical system, an embodiment of the present invention may operate in a receiver mode to receive external radiation and analyze the external radiation such as by receiving an originating beam from an optical system through the Twyman-Green interferometer without using the Twyman-Green interferometer for producing a fringe pattern but passing the beam to the Mach-Zehnder interferometer for producing a fringe pattern for analysis. This mode of operation is referred to herein as a Mach-Zehnder receive mode and is depicted in FIG. 4. Thus by combining a Twyman-Green interferometer with a Mach-Zehnder interferometer, the apparatus may be used to probe optical systems and to receive originating beams from an optical system. In FIG. 4 there are no incident beams from a light source, collimation at the first lens 21, reflection or transmission at the first beam splitter 31, or retroreflection at the first mirror 41. By first aligning the reference mirror to the outgoing beam, such as by using a corner cube to retroreflect the outgoing beam and adjusting the reference mirror 41 to null the resulting interference pattern, and then aligning the pinhole 76 to the retroreflected outgoing beam, the Twyman-Green interferometer may be used to facilitate alignment to subsequently transmit the external radiation through the small pinhole. The device can then be used in a receiver mode where a beam is received from an optical system and reflected from the Twyman-Green interferometer beamsplitter into the Mach-Zehnder interferometer. The device is as such a transceiver, both a transmitter and a receiver, by sending electromagnetic radiation from a light source to an optical system and then receiving a resultant beam from the optical system. The device is only a receiver when simply receiving an external originating beam from an optical system for analysis. When operating in a transceiver mode, an embodiment of the present invention is capable of using either the Twyman-Green interferometer if the coherence length is long enough or the Mach-Zehnder interferometer, whether the coherence length is long enough to be used with the Twyman-Green interferometer or not. Thus by combining a device with both a Twyman-Green interferometer and a Mach-Zehnder interferometer, the instrument is better able to operate than it would with either interferometer alone. Twyman-Green mode operations are useful with long coherence lengths where an incident light source is used for a transceiver mode. Twyman-Green mode operations provide rather simple alignment to the optical system and allow for aberrations of up to many waves. By comparison, Mach-Zehnder operations permit both transceiver and receiver modes and are useful for both long and short coherence lengths. Mach-Zehnder mode operations are typically more difficult to align to an optical system than a Twyman-Green mode operation and are more effective with few and/or small aberrations.

One of ordinary skill in the art will recognize the benefits of substantially decreasing the size and weight of the inspection apparatus and the additional benefit of the redundancy for different coherence length light sources applied to optical paths with different lengths such as when testing a single optical component of an optical system or when testing a longer optical path of the optical system. For example, by building the apparatus out of MOEM components in the new technology referred to as FS-MOB (free-space micro-optical bench), the reduced-size device will be small enough to permanently embed into the optical system for testing when the optical system is in operation, or possibly during use. Embedded inspection devices are particularly advantageous for such optical system as in the emerging domain of airborne laser platforms, such as laser weapons systems. Miniaturization of inspection tools and embedding inspection tools provides greater quality control by allowing inspection tools to be used in more locations than into which currently available larger devices are capable of fitting and in locations which cannot be accessed for temporary inspection. Miniaturization may be achieved by embodiments of the present invention while retaining critical features and functionality. MEM and MOEM miniaturization may be cost effective, particularly by providing the capability of in-operation and during-use inspection and re-inspection of optical systems, such as during in-flight airborne operations. Similarly, embedded inspection devices also require less time in operation than installation, testing, and removal of larger, temporary inspection devices, thereby reducing the costs associated with inspecting the optical systems. An injection optic, such as a mirror, may be temporarily inserted, either automatically or manually, to permit the optical system to be probed. In addition to an injection optic, the optical beam from the test device will be retroreflected back to the test device, possibly by another introduced optical element.

Further by imbedding the inspection apparatus into an optical system, the inspection may be performed remotely by individuals who may not otherwise be skilled with handling hardware and working in and around optical systems, such as handling current systems which are much larger and heavier with exposed vulnerable parts and require temporary placement in or around the optical system. Thus, embedded inspection devices expose the optical system under test to less risk of harm by minimizing or precluding invasive inspection and diagnostic tools into a critically aligned optical path being tested. Embedded inspection devices also reduce the potential for internal drift and misalignment of components of the inspection device itself. By embedding embodiments of the present invention, such as embodiments comprising MOEM components and/or devices, into optical systems, remote or automated inspection may be used for remote or automated diagnosis and adjustment of the optical components of the optical system to correct for deficiencies or aberrations. Additional devices and subsystems, such as hardware, circuitry, and control software, may be included in the optical system to permit remote and/or automatic adjustment of components of the optical system without requiring external devices to physically enter the optical system. The control of the adjustment of the optical system may be performed by a different system than the inspection system or may be performed by a subsystem of a larger inspection and adjustment control system. In some instances, the adjustment system may be able to evaluate how well the correction is done, such as by re-inspecting the system and reanalyzing the resulting output. Open loop control software could be used to interact with and operate MEM and MOEM devices such as MOEM chips to remotely control and move MOEM lenses, beam splitters, mirrors, shutters, attenuators, and pinholes of embodiments of the present invention.

In addition to the ability to embed embodiments of the present invention into an optical system, miniaturization of embodiments of the present invention, such as embodiments comprising MOEM components, may also possibly increase the performance of the smaller inspection devices due to increased accuracy, such as from the use of smaller apertures, and may reduce internal aberrations of the inspection tool. For example, reducing the aperture typically improves accuracy because smaller components may have smaller surface figure errors.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for inspecting an optical system, comprising:
   a combination interferometer, comprising micro-optoelectromechanical components forming:
      a Twyman-Green interferometer, comprising:
         a first lens;
         a first beam splitter optically coupled to the first lens, wherein the first lens is positioned so that an output beam from the first lens is incident upon the first beam splitter;
         a first mirror optically coupled to the first beam splitter;
         a second lens optically coupled to the beam splitter, wherein the second lens is positioned so that an output beam from the first beam splitter that is not the output beam which is transmitted to the first mirror is incident upon the second lens; and
         a third lens optically coupled to the beam splitter, wherein the third lens is positioned so that an output beam form the first beam splitter that is a recombination of a beam from the first mirror and a beam from the second lens is incident upon the third lens; and
      a Mach-Zehnder interferometer optically coupled to receive output beams from the Twyman-Green interferometer, comprising:
         a second beam splitter optically coupled to the third lens of the Twyman Green interferometer;
         a second mirror optically coupled to the second beam splitter;
         a third mirror optically coupled to the second beam splitter;
         a pinhole aperture optically aligned between at least one of the second beam splitter and the second mirror and the second beam splitter and the third mirror; and
         a third beam splitter optically coupled to the second mirror and the third mirror,
      wherein the combination interferometer is compactly configured for embedding in the optical system.

2. The apparatus of claim 1, wherein the first mirror comprises a corner cube reflector.

3. The apparatus of claim 1, further comprising:
   a light source optically coupled to impinge upon the first lens of the Twyman-Green interferometer and;
   an optical sensor optically coupled to receive from the Mach-Zender interferometer.

4. The apparatus of claim 1, further comprising a first extemal focusing element optically coupled to receive output beams from and impinge upon the Twyman-Green interferometer.

5. The apparatus of claim 4, wherein the first external focusing element is selected from the group consisting of a mirror and a lens.

6. The apparatus of claim 1, further comprising a second external focusing element optically coupled to receive from the Mach-Zehnder interferometer of the combination interferometer and to impinge upon the optical sensor.

7. The apparatus of claim 1, further comprising a MOEM attenuator aligned between at least one of the second beam splitter and the second mirror and the second beam splitter and the third mirror.

8. The apparatus of claim 1, further comprising a MOEM shutter aligned between the pinhole aperture and the second mirror and capable of blocking the optical transmission through the pinhole aperture.

9. The apparatus of claim 1, wherein the first, second, and third lenses are MOEM lenses selected from the group consisting of MOEM ball lenses, MOEM GRIN lenses, microlenses, refractive microlenses, zone plates, and diffractive lenses.

10. The apparatus of claim 1, wherein the third lens is a focusing lens.

11. A system for performing optical wavefront diagnosis, comprising:
    an optical system;
    a MOEM optical beam diagnostic apparatus embedded in the optical system, configured for analyzing the optical system, and comprising a Twyman-Green interferometer and a Mach-Zehnder interferometer optically coupled to receive output beams from the Twyman-Green interferometer, wherein the Twyman-Green and Mach-Zehnder interferometers are formed from micro-optoelectromechanical components such that the optical beam diagnostic apparatus is compactly configured for embedding in the optical system.

12. The system of claim 11, wherein the Twyman-Green interferometer comprises micro-optoelectromechanical components forming:
    a first lens;
    a first beam splitter optically coupled to the first lens, wherein the first lens is positioned so that an output beam from the first lens is incident upon the first beam splitter;
    a first mirror optically coupled to the first beam splitter;
    a second lens optically coupled to the beam splitter, wherein the second lens is positioned so that an output beam from the first beam splitter that is not the output beam which is transmitted to the first mirror is incident upon the second lens; and
    a third lens optically coupled to the beam splitter, wherein the third lens is positioned so that an output beam form the first beam splitter that is a recombination of a beam from the first mirror and a beam from the second lens is incident upon the third lens; and wherein the Mach-Zehnder interferometer comprises micro-optoelectromechanical components forming:

a second beam splitter optically coupled to the third lens of the Twyman Green interferometer;

a second mirror optically coupled to the second beam splitter;

a third mirror optically coupled to the second beam splitter;

a pinhole aperture optically aligned between at least one of the second beam splitter and the second mirror and the second beam splitter and the third mirror; and a third beam splitter optically coupled to the second mirror and the third mirror.

13. The system of claim 12, further comprising a MOEM attenuator aligned between at least one of the second beam splitter and the second mirror and the second beam splitter and the third mirror.

14. The system of claim 12, further comprising a MOEM shutter aligned between the pinhole aperture and the second mirror and capable of blocking the optical transmission through the pinhole aperture.

15. A method of inspecting an optical system using micro-optoelectromechanical components embedded in the optical system, comprising the steps of:

(i) splitting a beam of a light source embedded in the optical system into a first transmitted beam and a first reflected beam within the optical system;

(ii) blocking the first reflected beam within the optical system;

(iii) converging the first transmitted beam within the optical system to form an inspection beam for inspecting the optical system;

(iv) receiving a resultant beam within the optical system and from the optical system;

(v) collimating the resultant beam within the optical system;

(vi) reflecting the resultant beam within the optical system;

(vii) converging the resultant beam within the optical system;

(viii) splitting the resultant beam into a resultant transmitted beam and a resultant reflected beam with in the optical system;

(ix) twice reflecting the resultant transmitted beam within the optical system;

(xi) reflecting the resultant reflected beam within the optical system;

(xii) transmitting the resultant reflected beam within the optical system; and (xiii) recombining the resultant reflected beam and the resultant transmitted beam within the optical system to produce an output beam.

16. The method of claim 15, wherein the step of blocking the first reflected beam comprises at least one of the modes of blocking selected from the group consisting of: (a) blocking a pinhole aperture and (b) aligning a reference mirror to nullify any resulting interference pattern from the first reflected beam retroreflected by the reference mirror.

17. The method of claim 15, further comprising the steps of:

focusing at least one of the resultant transmitted beam and the resultant reflected beam through a respective pinhole aperture; and focusing at least one of the resultant transmitted beam and the resultant reflected beam through at least one of a respective attenuator and a respective shutter.

18. The method of claim 17, further comprising the step of aligning at least one of the resultant transmitted beam and the resultant reflected beam to transmit through the respective pinhole aperture.

19. The method of claim 15, further comprising the steps of:

before (i) splitting the beam of the light source into the first transmitted beam and the first reflected beam, impinging the beam of the light source upon a first lens; and collimating the beam from the light source to produce a collimated beam that is then split into the first transmitted beam and the first reflected beam.

20. The method of claim 19, further comprising the steps of:

after collimating the beam from the light source and before (i) splitting the collimated beam, impinging the collimated beam upon a first beam splitter;

after (i) splitting the collimated beam and before (iii) converging the first transmitted beam, impinging the first transmitted beam upon a second lens;

after (v) collimating the resultant beam and before (vi) reflecting the resultant beam, impinging the resultant beam upon the first beam splitter;

after (vi) reflecting the resultant beam and before (vii) converging the resultant beam, impinging the resultant beam upon a third lens;

after (vii) converging the resultant beam and before (viii) splitting the resultant beam, impinging the resultant beam upon a second beam splitter;

after (viii) splitting the resultant beam and before (ix) reflecting the resultant transmitted beam, impinging the resultant transmitted beam upon a second mirror;

after (ix) reflecting the resultant transmitted beam and before (x) reflecting the resultant transmitted beam, impinging the resultant transmitted beam upon a third beam splitter;

after (viii) splitting the resultant beam and before (xi) reflecting the resultant reflected beam, impinging the resultant reflected beam upon a third mirror; and after (xi) reflecting the resultant reflected beam and before (xii) transmitting the resultant reflected beam, impinging the resultant reflected beam upon a third beam splitter.

21. The method of claim 15, after (iii) converging the first transmitted beam and before (iv) receiving the resultant beam from the optical system, further comprising the step of collimating the inspection beam for inspecting the optical system.

22. The method of claim 21, further comprising the steps of:

after (iii) converging the first transmitted beam and before collimating the inspection beam, impinging the inspection beam upon an external focusing lens; and after collimating the inspection beam, impinging the inspection beam upon the optical system.

23. The method of claim 22, further comprising the steps of:

after impinging the inspection beam upon the optical system, after (iv) receiving the resultant beam from the optical system, and before (v) collimating the resultant beam, impinging the resultant beam upon the external focusing lens;

after impinging the resultant beam upon the external focusing lens and before (v) collimating the resultant beam, converging the resultant beam; and after converting the resultant beam and before (v) collimating the resultant beam, impinging the resultant beam upon a lens.

24. The method of claim 21, further comprising the step of converging the resultant beam after (iv) receiving the resultant beam from the optical system and before (v) collimating the resultant beam.

25. The method of claim 15, further comprising the steps of:
imaging the output beam; and
capturing the output beam.

26. The method of claim 25, further comprising the steps of:
impinging the output beam upon an external focusing lens; and
impinging the output beam upon an optical sensor.

27. The method of claim 15, further comprising the steps of:
operating the optical system; and
re-inspecting the optical system.

28. The method of claim 15, further comprising the step of periodically repeating the steps of inspecting the optical system.

29. The method of claim 15, further comprising the step of analyzing the output beam.

30. The method of claim 29, further comprising the step of adjusting the optical system based upon the analysis of the output beam.

31. The method of claim 30, wherein the adjustments are performed using at least one of micro-electromechanics and micro-optoelectromechanics.

32. The method of claim 30, further comprising the step of re-inspecting the optical system.

33. The method of claim 15, further comprising the step of analyzing the output beam for at least one of the interferograms selected from the group consisting of a fringe pattem and phase shifting.

34. A method of inspecting an optical system using micro-optoelectromechanical components embedded in the optical system, comprising the steps of:
splitting a beam of a light source into a first transmitted beam and a first reflected beam;
retroreflecting the first reflected beam;
converging the first transmitted beam to fonn an inspection beam for inspecting the optical system;
receiving a resultant beam from the optical system;
collimating the resultant beam;
reflecting the resultant beam;
transmitting the retroreflected beam;
converging the resultant beam and the retroreflected beam;
splitting the retroreflected beam into a second transmitted beam and a second reflected beam;
splitting the resultant beam into a third transmitted beam and a third reflected beam;
blocking one of the second and third transmitted beams and the second and third reflected beams; and
producing an output beam from the beams that are not blocked.

35. The method of claim 34, wherein the step of blocking comprises blocking a pinhole aperture.

36. An apparatus for inspecting an optical system, comprising:

a combination interferometer, comprising micro-optoelectromechanical components forming:
a Twyman-Green interferometer, comprising:
a first lens;
a first beam splitter optically coupled to the first lens, wherein the first lens is positioned so that an output beam from the first lens is incident upon the first beam splitter;
a first mirror optically coupled to the first beam splitter;
a second lens optically coupled to the beam splitter, wherein the second lens is positioned so that an output beam from the first beam splitter that is not the output beam which is transmitted to the first mirror is incident upon the second lens; and
a third lens optically coupled to the beam splitter, wherein the third lens is positioned so that an output beam form the first beam splitter that is a recombination of a beam from the first mirror and a beam from the second lens is incident upon the third lens;
a Mach-Zehnder interferometer optically coupled to receive output beams from the Twyman-Green interferometer, comprising:
a second beam splitter optically coupled to the third lens of the Twyman Green interferometer;
a second mirror optically coupled to the second beam splitter;
a third mirror optically coupled to the second beam splitter;
a pinhole aperture optically aligned between at least one of the second beam splitter and the second mirror and the second beam splitter and the third mirror; and
a third beam splitter optically coupled to the second mirror and the third mirror; and
at least one of (a) a MOEM attenuator aligned between at least one of the second beam splitter and the second mirror and the second beam splitter and the third mirror and (b) a MOEM shutter aligned between the pinhole aperture and the second mirror and capable of blocking the optical transmission through the pinhole aperture.

37. The apparatus of claim 36, comprising a MOEM attenuator aligned between at least one of the second beam splitter and the second mirror and the second beam splitter and the third mirror.

38. The apparatus of claim 36, comprising a MOEM shutter aligned between the pinhole aperture and the second mirror and capable of blocking the optical transmission through the pinhole aperture.

39. A method of inspecting an optical system using micro-optoelectromechanical components embedded in the optical system, comprising the steps of:
(i) splitting a beam of a light source into a first transmitted beam and a first reflected beam;
(ii) blocking the first reflected beam;
(iii) converging the first transmitted beam to form an inspection beam for inspecting the optical system;
(iv) receiving a resultant beam from the optical system;
(v) collimating the resultant beam;
(vi) reflecting the resultant beam;
(vii) converging the resultant beam;
(viii) splitting the resultant beam into a resultant transmitted beam and a resultant reflected beam;
(ix) reflecting the resultant transmitted beam;
(x) reflecting the resultant transmitted beam;
(xi) reflecting the resultant reflected beam;

(xii) transmitting the resultant reflected beam; and
(xiii) recombining the resultant reflected beam and the resultant transmitted beam to produce an output beam,
wherein the step of blocking the first reflected beam comprises aligning a reference mirror to nullify any resulting interference pattern from the first reflected beam retroreflected by the reference mirror.

40. A method of inspecting an optical system using micro-optoelectromechanical components embedded in the optical system, comprising the steps of:
   (i) splitting a beam of a light source into a first transmitted beam and a first reflected beam;
   (ii) blocking the first reflected beam;
   (iii) converging the first transmitted beam to form an inspection beam for inspecting the optical system;
   (iv) receiving a resultant beam from the optical system;
   (v) collimating the resultant beam;
   (vi) reflecting the resultant beam;
   (vii) converging the resultant beam;
   (viii) splitting the resultant beam into a resultant transmitted beam and a resultant reflected beam;
   (ix) reflecting the resultant transmitted beam;
   (x) reflecting the resultant transmitted beam;
   (xi) reflecting the resultant reflected beam;
   (xii) transmitting the resultant reflected beam;
   (xiii) recombining the resultant reflected beam and the resultant transmitted beam to produce an output beam;
   (xiv) analyzing the output beam;
   (xv) adjusting at least one of the optical system and the testing system based upon the analysis of the output beam, wherein the adjustments are performed remotely using at least one of micro-electromechanics and micro-optoelectromechanics.

41. The method of claim 40, wherein adjusting the optical system comprises adjusting at least one component of the optical system, wherein at least one of micro-electromechanics and micro-optoelectromechanics are used to adjust at least one component of the optical system.

42. The method of claim 40, wherein adjusting the optical system comprises adjusting at least one component of the testing system, wherein at least one of micro-electromechanics and micro-optoelectromechanics are used to adjust at least one component of the testing system.

* * * * *